(12) United States Patent
Tamai

(10) Patent No.: US 12,194,739 B2
(45) Date of Patent: Jan. 14, 2025

(54) RECORDING DEVICE AND RECORDING METHOD

(71) Applicant: SEIKO EPSON CORPORATION, Tokyo (JP)

(72) Inventor: Takashi Tamai, Suwa (JP)

(73) Assignee: Seiko Epson Corporation, Tokyo (JP)

(*) Notice: Subject to any disclaimer, the term of this patent is extended or adjusted under 35 U.S.C. 154(b) by 161 days.

(21) Appl. No.: 18/166,270

(22) Filed: Feb. 8, 2023

(65) Prior Publication Data

US 2023/0249450 A1 Aug. 10, 2023

(30) Foreign Application Priority Data

Feb. 9, 2022 (JP) ................................ 2022-018570

(51) Int. Cl.
*B41J 2/045* (2006.01)
*B41J 2/21* (2006.01)

(52) U.S. Cl.
CPC ....... *B41J 2/04505* (2013.01); *B41J 2/04586* (2013.01); *B41J 2/21* (2013.01)

(58) Field of Classification Search
CPC ... B41J 2/211; B41J 2/21; B41J 2/2103; B41J 2/2141; B41J 2/2155; B41J 2/04505; B41J 2/04508; B41J 2/04581; B41J 2/04586
See application file for complete search history.

(56) References Cited

U.S. PATENT DOCUMENTS 11,273,633 B2 * 3/2022 Hagiwara ............ B41J 2/04581
2018/0264841 A1 9/2018 Hayashi

FOREIGN PATENT DOCUMENTS

JP 2018-153953 A 10/2018

* cited by examiner

*Primary Examiner* — Thinh H Nguyen
(74) *Attorney, Agent, or Firm* — WORKMAN NYDEGGER

(57) ABSTRACT

A recording device includes a recording head including a first nozzle group that ejects a first ink and a second nozzle group that ejects a second ink having a color different from that of the first ink, a moving unit that relatively moves the recording head and a medium in a moving direction intersecting with a nozzle alignment direction, and a control unit. The recording head includes a first nozzle range in which a distance between the first nozzle group and the second nozzle group in the moving direction is a first distance and a second nozzle range in which the distance is a second distance greater than the first distance. In a case in which recording is performed on a medium using nozzles belonging to the second nozzle range, when recording is performed with a secondary color through ejection of the first ink and the second ink.

4 Claims, 7 Drawing Sheets

RECORDING DEVICE AND RECORDING METHOD

The present application is based on, and claims priority from JP Application Serial Number 2022-018570, filed Feb. 9, 2022, the disclosure of which is hereby incorporated by reference herein in its entirety.

BACKGROUND

1. Technical Field

The present disclosure relates to a recording device and a recording method.

2. Related Art

A recording head included in an ink-jet printer includes nozzle groups in which nozzles are aligned in a nozzle alignment direction, for respective ink colors such as cyan (C), magenta (M), yellow (Y), and black (K). In the recording head, the nozzle groups for the respective ink colors are arranged to be away from each other in a moving direction in which the recording head and a medium such as a sheet relatively move. In the recording head as described above, there may be a plurality of distances as a distance between the nozzle groups for different colors in the moving direction in some cases. Hereinafter, the distance between the nozzle groups for different colors in the moving direction is referred to as an "inter-color distance".

When a plurality of distances are present as an inter-color distance between a first ink nozzle group and a second ink nozzle group, color unevenness in a secondary color, which is obtained by overlapping first ink and second ink with each other for recording, may be caused on a medium in some cases. As a technique for suppressing such color unevenness, there is disclosed a printing apparatus in which an upper limit of an ejectable ink amount per unit area is reduced for a color combination with a plurality of inter-color distances as compared to a color combination with a constant inter-color distance, by selecting a color conversion look-up table (LUT) used for color conversion processing (see JP-A-2018-153953).

In a system of selecting a color conversion LUT as in the related art, when a format of input data is a format after color conversion processing, that is, a format in which each pixel has a tone value indicating an ink amount for each ink, it is difficult to adopt a measure for suppressing color unevenness in a secondary color, which is caused by a plurality of inter-color distances. Thus, there is room for improvement for suppressing color unevenness caused by a plurality of inter-color distances.

SUMMARY

A recording device includes a recording head including a first nozzle group in which a plurality of nozzles configured to eject first ink are aligned in a nozzle alignment direction and a second nozzle group in which a plurality of nozzles configured to eject second ink having a color different from that of the first ink are aligned in the nozzle alignment direction, a moving unit configured to relatively move the recording head and a medium in a moving direction intersecting with the nozzle alignment direction, and a control unit configured to control the recording head and the moving unit, wherein the recording head includes a first nozzle range that corresponds to parts of the first nozzle group and the second nozzle group and in which a distance between the first nozzle group and the second nozzle group in the moving direction is a first distance and a second nozzle range that corresponds to parts of the first nozzle group and the second nozzle group and in which a distance between the first nozzle group and the second nozzle group in the moving direction is a second distance greater than the first distance and in a case in which recording is performed on the medium using nozzles belonging to the second nozzle range, when recording is performed on the medium with a primary color through ejection of any one of the first ink and the second ink, the control unit performs recording on the medium with the primary color through ejection of any one of the first ink and the second ink with an ink amount thereof corrected with a first correction value and when recording is performed on the medium with a secondary color through ejection of the first ink and the second ink, the control unit performs recording on the medium with the secondary color through ejection of the first ink and the second ink with ink amounts thereof corrected with a second correction value obtained by the first correction value and an off-set value.

A recording method performed by a recording device, the recording device including: a recording head including a first nozzle group in which a plurality of nozzles configured to eject first ink are aligned in a nozzle alignment direction and a second nozzle group in which a plurality of nozzles configured to eject second ink having a color different from that of the first ink are aligned in the nozzle alignment direction and a moving unit configured to relatively move the recording head and a medium in a moving direction intersecting with the nozzle alignment direction, the recording head including: a first nozzle range that corresponds to parts of the first nozzle group and the second nozzle group and in which a distance between the first nozzle group and the second nozzle group in the moving direction is a first distance and a second nozzle range that corresponds to parts of the first nozzle group and the second nozzle group and in which a distance between the first nozzle group and the second nozzle group in the moving direction is a second distance greater than the first distance, the recording method includes: a recording step of performing recording by controlling the recording head and the moving unit, wherein in the recording step, in a case in which the recording is performed on the medium using nozzles belonging to the second nozzle range, when the recording is performed on the medium with a primary color through ejection of any one of the first ink and the second ink, the recording is performed on the medium with the primary color through ejection of any one of the first ink and the second ink with an ink amount thereof corrected with a first correction value and when the recording is performed on the medium with a secondary color through ejection of the first ink and the second ink, the recording is performed on the medium with the secondary color through ejection of the first ink and the second ink with ink amounts thereof corrected with a second correction value obtained by the first correction value and an off-set value.

DESCRIPTION OF EXEMPLARY EMBODIMENTS

An exemplary embodiment of the present disclosure is described below with reference to the accompanying drawings. Note that each of the drawings is merely illustrative for describing the present exemplary embodiment. Since the respective drawings are illustrative, proportions, shapes, and intensity may not be precise, match each other, or some may be omitted.

1. DESCRIPTION FOR OUTLINE OF DEVICE CONFIGURATION

Figure 1:
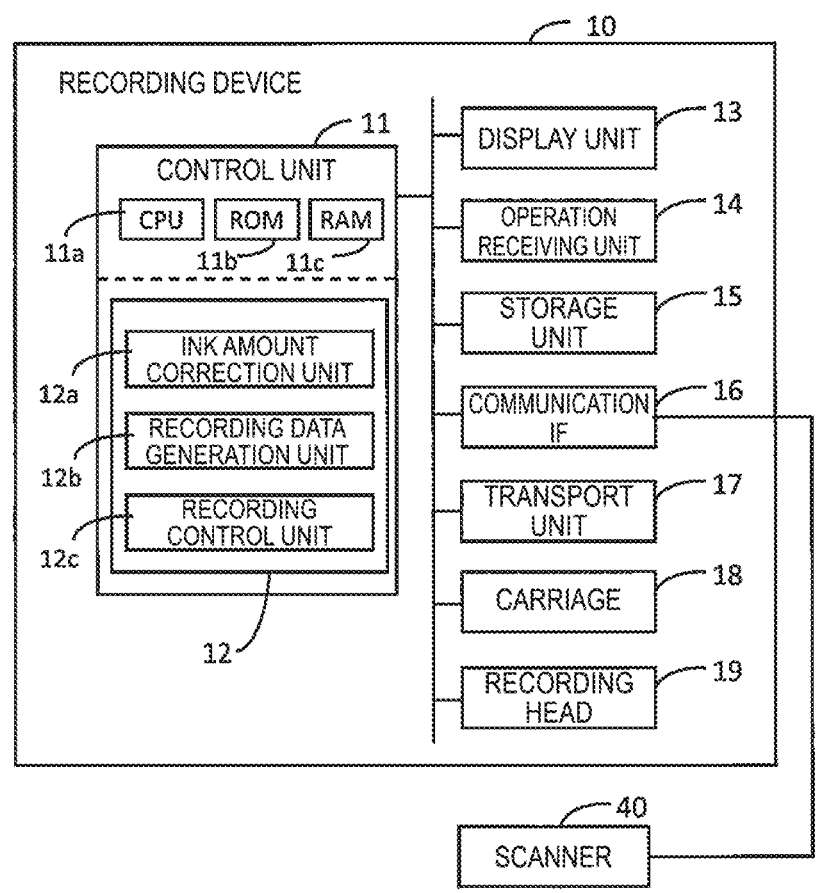
FIG. 1 is a block diagram illustrating a device configuration of the present exemplary embodiment in a simplified manner.

FIG. 1 illustrates a configuration of a recording device 10 according to the present exemplary embodiment in a simplified manner. The recording device 10 performs a recording method according to the present exemplary embodiment.

The recording device 10 includes a control unit 11, a display unit 13, an operation receiving unit 14, a storage unit 15, a communication IF 16, a transport unit 17, a carriage 18, a recording head 19, and the like. However, as described later, the carriage 18 may be omitted. IF is an abbreviation for interface. The control unit 11 includes, as a processor, one or more ICs including a CPU 11a, a ROM 11b, a RAM 11c, and the like, another non-volatile memory, and the like.

In the control unit 11, the processor, that is, the CPU 11a executes arithmetic processing in accordance with a program 12 stored in the ROM 11b, the other memory, or the like, using the RAM 11c or the like as a work area, to realize various functions such as an ink amount correction unit 12a, a recording data generation unit 12b, and a recording control unit 12c. The processor is not limited to the single CPU, and a configuration may be adopted in which the processing is performed by a hardware circuit such as a plurality of CPUs, an ASIC, or the like, or a configuration may be adopted in which the CPU and the hardware circuit work in concert to perform the processing.

The display unit 13 is a unit for displaying visual information, and is constituted, for example, by a liquid crystal display, an organic electroluminescence (EL) display, or the like. The display unit 13 may include a display and a drive circuit for driving the display. The operation receiving unit 14 is a unit for receiving an input from a user, and is realized, for example, by a physical button, a touch panel, a mouse, a keyboard, or the like. Of course, the touch panel may be realized as a function of the display unit 13. The display unit 13 and the operation receiving unit 14 may collectively be referred to as an operation panel of the recording device 10. The display unit 13 and the operation receiving unit 14 may be part of the configuration of the recording device 10, or may be peripheral devices externally coupled to the recording device 10.

The storage unit 15 is a storage unit realized by, for example, a hard disk drive, a solid state drive, or another memory. Part of the memory included in the control unit 11 may be regarded as the storage unit 15. The storage unit 15 may be regarded as part of the control unit 11. The storage unit 15 stores various correction values required in the present exemplary embodiment.

The communication IF 16 is a generic term for one or a plurality of IFs for performing communication between the recording device 10 and an external device in a wired or wireless manner, in accordance with a predetermined communication protocol including a known communication standard. Examples of the external device include a personal computer, a server, a smartphone, and a tablet-type terminal. As illustrated in FIG. 1, the recording device 10 may be coupled to an external scanner 40 via the communication IF 16. The scanner 40 is a reading device capable of optically reading a document being a recording result.

The transport unit 17 is a unit for transporting a medium 30 in a predetermined transport direction under the control of the control unit 11. The transport unit 17 includes, for example, a roller that rotates to transport the medium 30, and a motor being a rotation power source. Further, the transport unit 17 may be a mechanism that transports the medium 30 with the medium 30 placed on a belt or a palette driven by a motor. The medium 30 is, for example, a sheet. The medium 30 may be a medium that can be subjected to recording with a liquid, and may be a material other than paper such as a film and a fabric.

The carriage 18 is a unit that reciprocates along a predetermined direction by a driving force of a carriage motor, which is not illustrated, under the control of the control unit 11. The recording head 19 is mounted on the carriage 18. Therefore, in a configuration in which the recording device 10 includes the carriage 18, the recording head 19 moves together with the carriage 18. In contrast, in a configuration in which the recording device 10 does not include the carriage 18, the recording head 19 does not move.

The recording head 19 is a unit that performs recording through ejection of a liquid onto the medium 30 by an ink-jet method under the control of the control unit 11. The liquid is mainly ink, but the recording head 19 is capable of ejecting a liquid other than ink.

The recording device 10 may be realized by a configuration including a single printer, or may be realized by a system including a plurality of devices that are communicatively coupled to each other. For example, the recording device 10 may be a system including an information processing device that functions as the control unit 11 and a printer that includes the transport unit 17, the carriage 18, and the recording head 19 and that performs recording under the control of the information processing device. In this case, the information processing device can be regarded as the record control device, the image processing device, or the like.

2. DESCRIPTION FOR RECORDING HEAD

Figure 2:
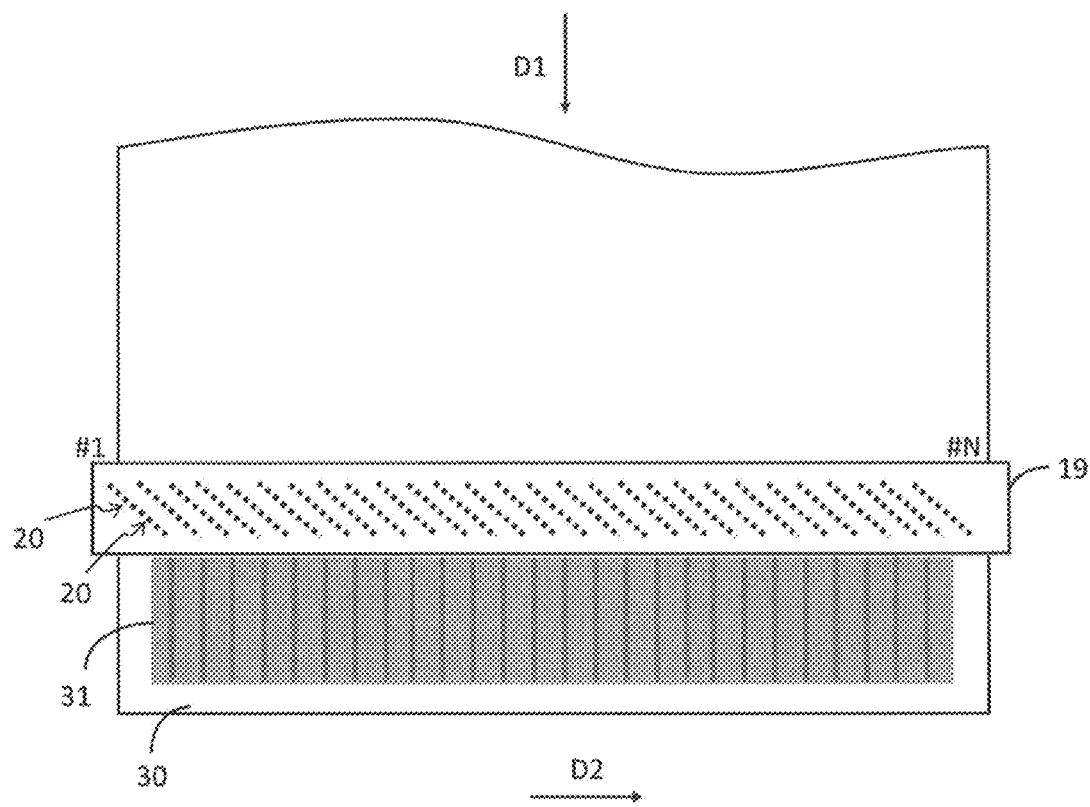
FIG. 2 is a view illustrating a relationship between a medium and a printing head in a simplified manner, as seen from above.
Figure 3:
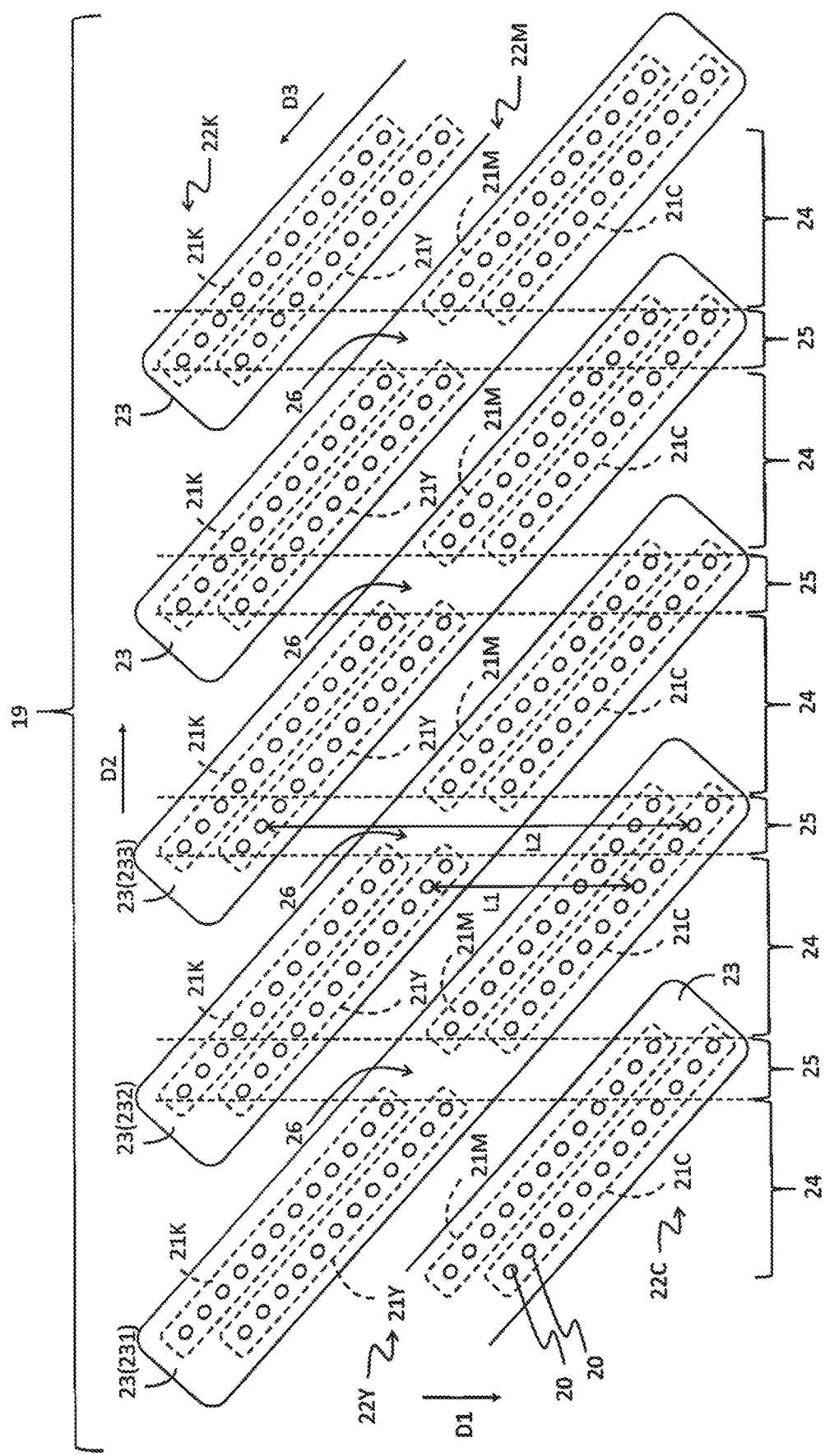
FIG. 3 is a view illustrating part of an example of the recording head in an enlarged manner.

FIG. 2 illustrates a relationship between the medium 30 and the recording head 19 in a simplified manner, as seen from above. In FIG. 2 and FIG. 3 described later, the carriage 18 is not present, and the recording head 19 is a line-type head and ejects the ink in a stationary state in a transport path of the medium 30. The recording head 19 includes a plurality of nozzles 20 for ejecting a liquid such as ink. In FIG. 2, the plurality of nozzles 20 included in the recording head 19 are indicated with black points in a quite simple manner. The recording head 19 is capable of ejecting ink of a plurality of colors such as C, M. Y, and K. The recording head 19 may also be referred to as a liquid ejection head, a printing head, a character printing head, an ink-jet head, or the like.

A direction D1 indicated with the arrow indicates a transport direction D1 in which the transport unit 17 transports the medium 30. Upstream and downstream in the transport direction D1 are simply denoted as upstream and downstream in the following description. The transport unit 17 is a unit for realizing relative movement between the recording head 19 and the medium 30 in the transport direction D1, and hence corresponds to a "moving unit". The transport direction D1 corresponds to a "moving direction". A direction D2 orthogonal to or substantially orthogonal to the transport direction D1 is a longitudinal direction D2 of the recording head 19. The length of the medium 30 in the longitudinal direction D2 is referred to as a medium width. The line-type recording head 19 has such a length as to cover the medium width. The longitudinal direction D2 may also be referred to as a width direction D2.

The control unit 11 causes the transport unit 17 to transport the medium 30 at a predetermined speed, and causes the recording head 19 to eject the ink onto the medium 30 being transported, based on recording data expressing an image. An ink droplet ejected from the nozzle 20 is referred to as a dot. As is known, in the recording head 19, a driving element is provided for each of the nozzles 20. As application of a driving signal to the driving element of each of the nozzles 20 is controlled based on the recording data, each of the nozzles 20 ejects a dot or does not eject a dot. In this manner, the image expressed by the recording data is recorded on the medium 30. Ejection of a dot is also referred to as dot-on, and non-ejection of a dot is also referred to as dot-off. FIG. 2 illustrates a state in which an image 31 is recorded on a region of the medium 30 that passed through the recording head 19.

FIG. 3 illustrates part of an example of the recording head 19 illustrated in FIG. 2 in an enlarged manner. In FIG. 3, each of a plurality of white circles indicates the nozzle 20. Schematically, the recording head 19 is formed by a plurality of nozzle chips 23 being aligned. The respective nozzle chips 23 have a common configuration. The nozzle chip 23 includes nozzle rows 21C, 21M, 21Y, and 21K for the respective ink colors. The nozzle row 21C is formed by the plurality of nozzles 20 capable of ejecting ink C being aligned along a nozzle alignment direction D3 at predetermined intervals. Similarly, the nozzle row 21M is formed by the plurality of nozzles 20 capable of ejecting ink M being aligned along the nozzle alignment direction D3 at predetermined intervals, the nozzle row 21Y is formed by the plurality of nozzles 20 capable of ejecting ink Y being aligned along the nozzle alignment direction D3 at predetermined intervals, and the nozzle row 21K is formed by the plurality of nozzles 20 capable of ejecting ink K being aligned along the nozzle alignment direction D3 at predetermined intervals.

In the example of FIG. 3, the nozzle alignment direction D3 obliquely intersects with both the transport direction D1 and the width direction D2. The nozzle alignment direction D3 can also be regarded as a longitudinal direction of the nozzle chip 23. Further, in the nozzle chip 23, the nozzle row 21K and the nozzle row 21Y are positioned on the left side, and the nozzle row 21M and the nozzle row 21C are positioned on the right side. In the description for FIG. 2 and FIG. 3, it is assumed that left and right is the left and right when viewing upstream from downstream. Further, in the example of FIG. 3, in the nozzle chip 23, the nozzle row 21K is positioned upstream of the nozzle row 21Y, and the nozzle row 21M is positioned upstream of the nozzle row 21C. Moreover, in the nozzle chip 23, a distance corresponding to a few nozzles, that is, a non-nozzle portion 26 in which no nozzle 20 is provided is secured between the left-side pair of the nozzle rows 21K and 21Y and the right-side pair of the nozzle rows 21M and 21C. The non-nozzle portion 26 is not only a region in which no nozzle 20 is provided as in FIG. 3, but may be a region in which the nozzle 20 not in use is present, in other words, a region that can be regarded as a region substantially without the nozzle 20.

Focusing on the respective nozzle rows 21K in the configuration in which the plurality of nozzle chips 23 are aligned as described above, it can be said that the plurality of nozzles 20 capable of ejecting the ink K are aligned in the recording head 19 along the width direction D2 at constant intervals or at substantially constant intervals. Therefore, the plurality of nozzle rows 21K form a nozzle group 22K associated with the ink K. Similarly, focusing on the respective nozzle rows 21Y included in the respective nozzle chips 23, the plurality of nozzles 20 capable of ejecting the ink Y are aligned along the width direction D2. The plurality of nozzle rows 21Y form a nozzle group 22Y associated with the ink Y. Focusing on the respective nozzle rows 21M included in the respective nozzle chips 23, the plurality of nozzles 20 capable of ejecting the ink M are aligned along the width direction D2. The plurality of nozzle rows 21M form a nozzle group 22M associated with the ink M. Focusing on the respective nozzle rows 21C included in the respective nozzle chips 23, the plurality of nozzles 20 capable of ejecting the ink C are aligned along the width direction D2. The plurality of nozzle rows 21C form a nozzle group 22C associated with the ink C.

For convenience of the description, expressions of nozzle position and raster line are used. Nozzle positions are positions of the respective nozzles 20 in the width direction D2, and can be identified with numerical symbols being integers from #1 to #N along the width direction D2. In FIG. 2, the left-end nozzle position in the width direction D2 is indicated as a nozzle position #1, and the right-end nozzle position is indicated as a nozzle position #N. As understood from FIG. 3, in the recording head 19, the nozzles 20 for the ink K, the ink Y, the ink M, and the ink C are present along the transport direction D1 correspondingly to each nozzle position. A raster line is a line of pixels along the direction D1, and is also referred to as a pixel row. Further, a result obtained by recording the pixel row on the medium 30 can also be referred to as a raster line. One nozzle position corresponds to one raster line.

One of the ink of a plurality of colors ejected from the recording head 19 is referred to as a "first ink", and another thereof is referred to as a "second ink" in some cases. Further, of the nozzle groups 22C, 22M, 22Y, and 22K, a nozzle group corresponding to the first ink is referred to as a "first nozzle group", and a nozzle group corresponding to the second ink is referred to as a "second nozzle group". In the present exemplary embodiment, the recording head 19 includes a "first nozzle range" and a "second nozzle range". The first nozzle range corresponds to parts of the first nozzle group and the second nozzle group, where the distance between the first nozzle group and the second nozzle group in the moving direction is a first distance. The second nozzle range corresponds to parts of the first nozzle group and the second nozzle group, where the distance between the first nozzle group and the second nozzle group in the moving direction is a second distance greater than the first distance.

In FIG. 3, the reference symbol 24 indicates the first nozzle range, and the reference symbol 25 indicates the second nozzle range.

While focusing on three subsequent nozzle chips 231, 232, and 233 of the plurality of nozzle chips 23 aligned along the width direction D2 as an example, a relationship between the distance between the first nozzle group and the second nozzle group in the moving direction, that is an inter-color distance, and the first nozzle range 24 and the second nozzle range 25 is described. The nozzle chip 231 and the nozzle chip 232 are adjacent to each other, and the range of the nozzle chip 231 and the range of the nozzle chip 232 partially overlap with each other in the width direction D2. Similarly, the nozzle chip 232 and the nozzle chip 233 are adjacent to each other, and the range of the nozzle chip 232 and the range of the nozzle chip 233 partially overlap with each other in the width direction D2. Moreover, the right-side end of the nozzle chip 231 and the left-side end of the nozzle chip 233 partially overlap with each other in the width direction D2 with the nozzle chip 232 sandwiched therebetween. The range in which the right-side end of the nozzle chip 231 and the left-side end of the nozzle chip 233 overlap with each other in the width direction D2 is the second nozzle range 25, and this corresponds to the non-nozzle portion 26 of the nozzle chip 232.

Here, it is assumed that the first ink is the ink Y and the second ink is the ink C. While focusing on an inter-color distance between the nozzle group 22Y and the nozzle group 22C in the transport direction D1, the inter-color distance equals to L1 in the first nozzle range 24 in which the nozzle row 21Y of the nozzle chip 232 and the nozzle row 21C of the nozzle chip 231 overlap with each other in the width direction D2. Meanwhile, in the second nozzle range 25 that corresponds to the non-nozzle portion 26 of the nozzle chip 232 and in which the nozzle row 21Y of the nozzle chip 233 and the nozzle row 21C of the nozzle chip 231 overlap with each other in the width direction D2, the inter-color distance equals to L2. As understood from FIG. 3, L1 is less than L2. The inter-color distance L1 corresponds to an example of the "first distance", and the inter-color distance L2 corresponds to an example of the "second distance". Such a relationship between the first nozzle range 24 and the second nozzle range 25, and the inter-color distances L1 and L2 is similarly repeated in the relationship among the plurality of nozzle chips 23 forming the recording head 19.

According to the example of FIG. 3, in addition to the combination of the ink Y and the ink C, each of a combination of the ink Y and the ink M, a combination of the ink K and the ink C, and a combination of the ink K and the ink M corresponds to the combination of the first ink and the second ink with the plurality of inter-color distances. Meanwhile, in the case of a combination of the ink K and the ink Y, the inter-color distance between the nozzle group 22K and the nozzle group 22Y in the transport direction D1 is constant at any position in the width direction D2. Thus, the combination does not correspond to the combination of the first ink and the second ink with the plurality of inter-color distances. For the similar reason, a combination of the ink M and the ink C does not correspond to the combination of the first ink and the second ink with the plurality of inter-color distances.

According to the example of FIG. 3, the dots are sequentially ejected at the respective nozzle positions in the order of the ink K, the ink Y, the ink M, and the ink C from the recording head 19, onto the medium 30 transported from upstream to downstream. In other words, the raster line can be recorded by sequentially ejecting the dots in the order of the ink K, the ink Y, the ink M, and the ink C at the respective nozzle positions. As understood from FIG. 3, the first nozzle range 24 and the second nozzle range 25 are ranges sectioned along the width direction D2. Thus, whether a nozzle 20 belongs to the first nozzle range 24 or the second nozzle range 25 is determined in advance in accordance with a nozzle position of the nozzle 20.

Note that the arrangement of the nozzle rows 21C, 21M, 21Y, and 21K in the nozzle chip 23 is only required to be common to the nozzle chips 23, and need not be the same as that illustrated in FIG. 3. For example, in each of the nozzle chips 23, the nozzle row 21Y and the nozzle row 21C may be arranged at switched positions. Therefore, depending on the arrangement of the nozzle rows 21C, 21M, 21Y, and 21K in the nozzle chip 23, the combination of the ink K and the ink Y or the combination of the ink M and the ink C may correspond to the combination of the first ink and the second ink with the plurality of inter-color distances. Further, the nozzle alignment direction D3 need not be oblique as in FIG. 3, and may be parallel to the width direction D2, that is, orthogonal to the transport direction D1.

In the example of FIG. 3, when recording is performed on the medium 30 with a secondary color obtained by ejecting the ink Y from the nozzle group 22Y and ejecting the ink C from the nozzle group 22C to cause the ink Y and the ink C to overlap with each other, color unevenness is caused in some cases. The secondary color generated from the ink Y and the ink C is a green-based color. In other words, due to the difference between the inter-color distances L1 and L2, a time difference from ejection of a dot of the ink Y onto the medium 30 to ejection of a dot of the ink C is different between a case in which the nozzles 20 belonging to the first nozzle range 24 are used and a case in which the nozzles 20 belonging to the second nozzle range 25 are used. This difference between the time differences affects drying or bleeding of the ink, and causes a difference of color intensity on the medium 30.

The image 31 illustrated in FIG. 2 is an example of a result of recording with the secondary color of the ink Y and the ink C. In the image 31, a state in which an intensity difference is caused between the secondary color recorded by the respective nozzles 20 belonging to the first nozzle range 24 and the secondary color recorded by the respective nozzles 20 belonging to the second nozzle range 25 is indicated in an easily understandable manner. In the present exemplary embodiment, in order to suppress such an intensity difference caused by recording the secondary color, that is, color unevenness, processing described below is executed.

3. DESCRIPTION FOR CORRECTION VALUE

During recording on the medium 30 using the nozzles 20 belonging to the second nozzle range 25, when recording is performed on the medium 30 with the primary color through ejection of any one of the first ink and the second ink, the control unit 11 performs recording on the medium 30 with the primary color through ejection of any one of the first ink and the second ink with an ink amount thereof corrected with a "first correction value". Meanwhile, during recording on the medium 30 using the nozzles 20 belonging to the second nozzle range 25, when recording is performed on the medium 30 with the secondary color through ejection of the first ink and the second ink, recording is performed on the medium 30 with the secondary color through ejection of the first ink and the second ink with ink amounts thereof corrected with a "second correction value" obtained by the first correction value and an "off-set value".

First, the first correction value and the off-set value are described.

As is known, the first correction value is a correction value for correcting variation of ejection characteristics for each of the nozzles 20, and is set in advance for each of the nozzles 20 included in the recording head 19. Even when exactly the same piece of data is supplied to each of the nozzles 20 corresponding to the same ink to perform ink ejection, a color value of a recording result on the medium 30 is slightly different for each of the nozzles 20. The color value is luminance, for example. Thus, in order to prevent variation of the respective nozzles 20 from being visually recognized from the recording result, the first correction value is required. The first correction value is basically set for all the nozzles 20 regardless of the first nozzle range 24 or the second nozzle range 25.

For example, when the first correction value is set for each of the nozzles 20 in the nozzle group 22K, a predetermined test pattern, which is generated through recording on the medium 30 with the ink K by causing each of the nozzles 20 in the nozzle group 22K to eject the ink K, is subjected to color measurement with the scanner 40 or the like. Then, the first correction value for each of the nozzles 20 in the nozzle group 22K is set in accordance with a color value for each of the nozzle positions, which is measured from the test pattern. Schematically, in accordance with a difference between an ideal reference value as a color value of the test pattern and an actual color value of the test pattern recorded with a nozzle 20, a correction value for canceling the difference, which is a correction value applied to an ink amount of the ink K, is set as the first correction value of this nozzle 20.

For example, in the case of the nozzle 20 whose color value in the recording result is darker than the reference value, its ink amount is more than required. Thus, a minus correction value for reducing the ink amount is set therefor. In contrast, in the case of the nozzle 20 whose color value in the recording result is brighter, its ink amount is less than required. Thus, a plus correction value for increasing the ink amount is set therefor. In the present exemplary embodiment, the first correction value that is thus set for each of the nozzles 20 in the nozzle groups 22C, 22M, 22Y, and 22K is stored in the storage unit 15 or in a memory accessible from the control unit 11 inside or outside of the recording device 10, and the control unit 11 is capable of performing correction of an ink amount using the first correction value.

The off-set value is a value for correcting the first correction value to obtain the second correction value. In the present exemplary embodiment, the off-set value is set only for each of the nozzles 20 belonging to the second nozzle range 25. Further, the set off-set value is used during recording with the secondary color of the first ink and the second ink.

Figure 4:
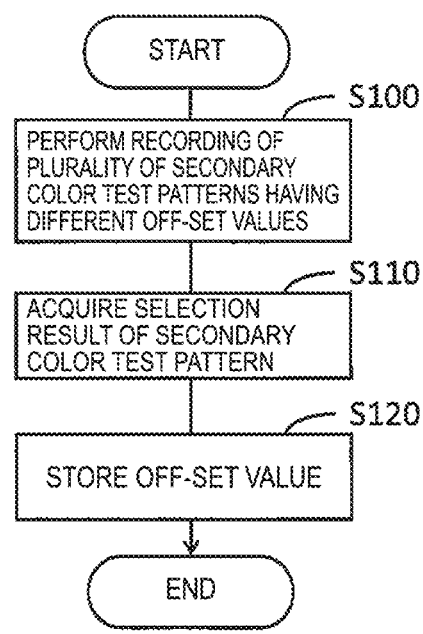
FIG. 4 is a flowchart illustrating off-set value setting processing.

FIG. 4 illustrates, using a flowchart, off-set value setting processing executed by the control unit 11 in accordance with the program 12. In FIG. 4 as well, assuming that the first ink is the ink Y and the second ink is the ink C, a case in which the off-set value is set for the secondary color of the ink Y and the ink C is described.

In Step S100, the control unit 11 controls the transport unit 17 and the recording head 19, causes each of the nozzles 20 in the first nozzle group to eject the first ink, and causes each of the nozzles 20 in the second nozzle group to eject the second ink. With this, a plurality of secondary color test patterns are recorded on the medium 30. In any one of the plurality of secondary color test patterns, ink amount correction with the first correction value is applied to secondary color test pattern image data expressing a secondary color test pattern. Moreover, for the ink amount with which recording is performed using the nozzles 20 belonging to the second nozzle range 25, an off-set value different for each of the secondary color test patterns is applied thereto before recording is performed. The secondary color test pattern image data is stored in the storage unit 15 in advance, for example.

Figure 5:
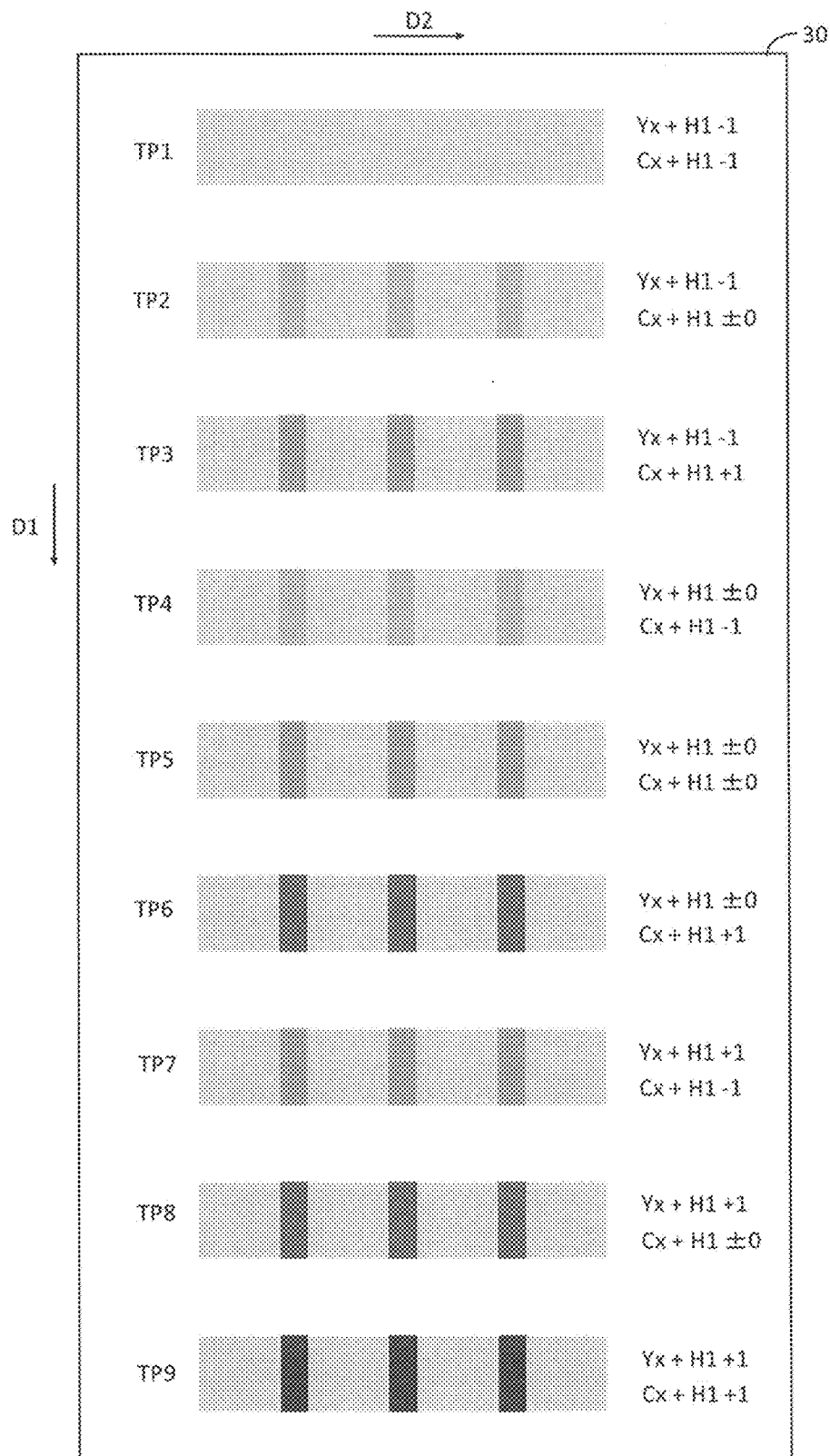
FIG. 5 is a view illustrating part of an example of a plurality of secondary color test patterns recorded on a medium.

FIG. 5 illustrates respective parts of the plurality of secondary color test patterns TP1, TP2, TP3, TP4, TP5, TP6, TP7, TP8, and TP9 recorded on the medium 30 in Step S100 in a simplified manner. The plurality of secondary color test patterns are aligned along the transport direction D1. In FIG. 5, ink amounts Yx and Cx used for recording, a first correction value H1, and an off-set value for each of the secondary color test patterns TP1, TP2, TP3, TP4, TP5, TP6, TP7, TP8, and TP9 are indicated on the medium 30 in an easily understandable manner. The ink amount Yx is an amount of the ink Y, which is defined for each pixel in the secondary color test pattern image data, and the ink amount Cx is an amount of the ink C, which is defined for each pixel in the secondary color test pattern image data. The ink amount is expressed in, for example, 256 tones from 0 to 255. Further, the ink amount may be regarded as an ink recording ratio per certain area when it is normalized and represented within a range from 0% to 100%.

The ink amounts Yx and Cx are each a value common to each pixel in the secondary color test patterns TP1, TP2, TP3, TP4, TP5, TP6, TP7, TP8, and TP9, and express an even plain green-based image as the secondary color test pattern. As described above, the first correction value H1 is a value that is set for each of the nozzles 20, and may be a plus value or a minus value depending on each of the nozzles 20. Therefore, Yx+H1 indicates that the ink amount Yx of the ink Y for each of the pixels forming the secondary color test pattern is corrected with the first correction value H1 for each of the nozzles 20 in the nozzle group 22Y that correspond to the respective pixels. A correspondence relationship between the pixels and the nozzles 20 used for pixel recording is known. Similarly, Cx+H1 indicates that the ink amount Cx of the ink C for each of the pixels forming the secondary color test pattern is corrected with the first correction value H1 for each of the nozzles 20 in the nozzle group 22C that correspond to the respective pixels.

In the example of FIG. 5, three types including −1, 0, and +1 are employed as the off-set values. In other words, there are nine combinations in total, which are obtained by combining cases in which any one of the off-set values −1, 0, and +1 is added to Yx+H1 and cases in which any one of the off-set values −1, 0, and +1 is added to Cx+H1. The secondary color test patterns TP1, TP2, TP3, TP4, TP5, TP6, TP7, TP8, and TP9 corresponding to all the nine combinations are recorded on the medium 30. For example, in the case of the secondary color test pattern TP7, of the pixels forming the secondary color test pattern, pixels recorded by the nozzles 20 belonging to the second nozzle range 25 are recorded on the medium 30 with the ink amount Yx of the ink Y corrected with the first correction value H1 and the off-set value of "+1" further added thereto as described above and with the ink amount Cx of the ink C corrected with the first correction value H1 and the off-set value of "−1" further added thereto as described above. Here, both the first correction value H1 and the off-set value are correction values for increasing or reducing the tone value as an ink amount.

As a matter of course, in any one of the secondary color test patterns TP1, TP2, TP3, TP4, TP5, TP6, TP7, TP8, and TP9, the first correction value H1 is applied to the pixels recorded by the nozzles 20 belonging to the first nozzle range 24, but the off-set value is not applied thereto. Further, after the ink amount Yx of the ink Y and the ink amount Cx of the ink C for each pixel are corrected with the first correction value H1 and, depending on the pixel position, the off-set value, the secondary color test pattern image data is subjected to halftone processing and converted into information indicating dot-on or dot-off for the ink Y and the ink C. With this, the recording data is obtained. The halftone processing is executed by, for example, a dither method or an error diffusion method. Subsequently, in accordance with the recording data, the recording head 19 causes each of the nozzles 20 in the nozzle groups 22Y and 22C to eject a dot, and thus the secondary color test pattern is recorded on the medium 30.

In Step S110, the control unit 11 acquires a selection result of the secondary color test pattern. A user visually recognizes and evaluates the plurality of secondary color test patterns TP1, TP2, TP3, TP4, TP5, TP6, TP7, TP8, and TP9 that are recorded on the medium 30 in Step S100. Then, the user selects the secondary color test pattern having the least degree of color unevenness, and inputs the selection result through an operation on the operation receiving unit 14. Then, the control unit 11 acquires the input selection result.

In any one of the secondary color test patterns TP1, TP2, TP3, TP4, TP5, TP6, TP7, TP8, and TP9, recording is performed after correcting the ink amounts Yx and Cx with the first correction value H1. Thus, unevenness for each of the nozzle positions due to variation of ejection characteristics for each of the nozzles 20 is eliminated. However, color unevenness corresponding to a difference of the inter-color distances of the first nozzle range 24 and the second nozzle range 25 as described above may be caused in the secondary color test patterns TP1, TP2, TP3, TP4, TP5, TP6, TP7, TP8, and TP9. In the example of FIG. 5, unevenness corresponding to a difference of the inter-color distances is caused in the secondary color test patterns TP2, TP3, TP4, TP5, TP6, TP7, TP8, and TP9, but is not caused in the secondary color test pattern TP1.

Therefore, a user can select and input the secondary color test pattern TP1 to the control unit 11. In other words, in the example of FIG. 5, it can be concluded that, as a result, the off-set value of "−1" relating to the ink Y and the off-set value of "−1" relating to the ink C are off-set values appropriate for eliminating color unevenness of the secondary color corresponding to a difference of the inter-color distances.

The control unit 11 may acquire a selection result of the secondary color test pattern from an input from the scanner 40, instead of an input from a user. In other words, a user causes the scanner 40 to read the medium 30 on which the plurality of secondary color test patterns TP1, TP2, TP3, TP4, TP5, TP6, TP7, TP8, and TP9 are recorded in Step S100. Then, the control unit 11 inputs, from the scanner 40, read image data as a reading result of the secondary color test patterns TP1, TP2, TP3, TP4, TP5, TP6, TP7, TP8, and TP9, which is obtained by the scanner 40. The control unit 11 may analyze the read image data, and select the secondary color test pattern having the least degree of color unevenness from the secondary color test patterns TP1, TP2, TP3, TP4, TP5, TP6, TP7, TP8, and TP9.

In Step S120, the control unit 11 stores, in the storage unit 15 or the like, the off-set values applied in Step S100 at the time of recording of the selected secondary color test pattern that is acquired in Step S110, in association with the ink colors to which the off-set values are applied and the secondary color, and terminates the flowchart in FIG. 4. Although details are omitted, as a matter of course, the first correction value for each of the nozzles 20 may be a value that is finely set for each tone value of the ink amount being a correction target.

As a matter of course, the control unit 11 is capable of executing the off-set value setting processing in FIG. 4 for each of ink combinations having a plurality of inter-color distances in the recording head 19 in addition to the secondary color generated from the ink Y and the ink C, and is capable of storing the off-set values appropriate for recording with the secondary color using the nozzles 20 in the second nozzle range 25. Further, the off-set value adopted for recording the plurality of secondary color test patterns in Step S100 need not be limited to the numerical values of −1, 0, and +1 described above. For example, different off-set values within a numerical value range from −3 to +3 may be adopted to record the plurality of secondary color test patterns.

4. RECORDING CONTROL PROCESSING

Figure 6:
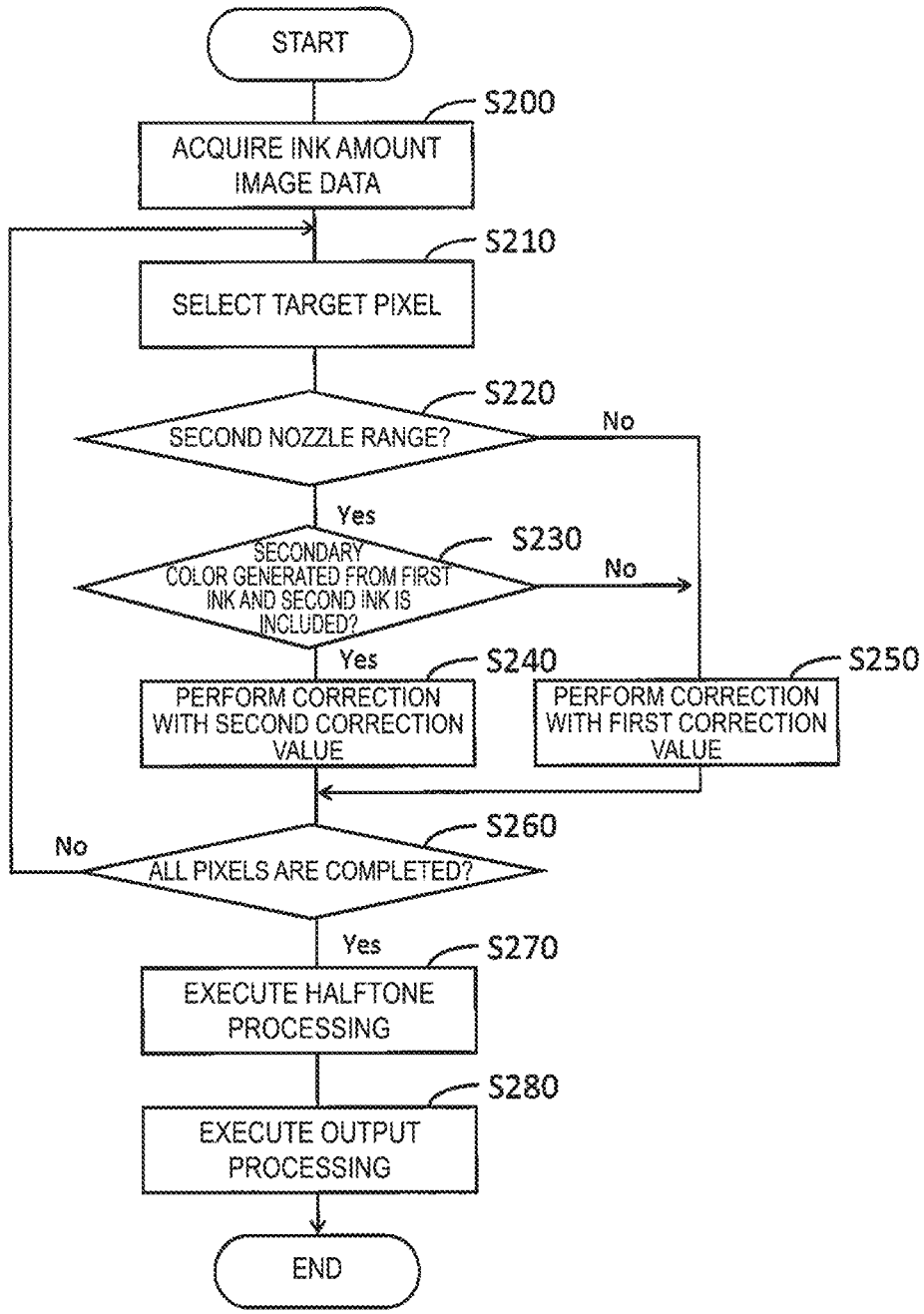
FIG. 6 is a flowchart illustrating recording control processing.

FIG. 6 illustrates, using a flowchart, recording control processing executed by the control unit 11 in accordance with the program 12. The flowchart involves a "recording step" in which the recording head 19 and the moving unit are controlled to perform recording.

In Step S200, the recording data generation unit 12b of the control unit 11 acquires "ink amount image data" expressing an image being a recording target. The ink amount image data is image data in which each pixel has an ink amount ejectable from the recording head 19 for each ink. For example, the recording data generation unit 12b acquires the ink amount image data designated by a user through an operation of the operation receiving unit 14, from an image data storage location such as the storage unit 15 and a memory inside or outside the recording device 10. Alternatively, the recording data generation unit 12b receives and acquires the ink amount image data, which is transmitted from an external device, via the communication IF 16.

When a format of image data at the time of acquisition is not that of the ink amount image data, the recording data generation unit 12b is only required to convert the image data into the ink amount image data. For example, when the acquired image data is RGB image data expressing tone values of red (R), green (G), and blue (B) for each pixel, each of the RGB tone values for each pixel in the image data is converted into a CMYK tone value with reference to a color conversion LUT in which a conversion relationship between RGB and CMYK is defined in advance. In this manner, in any case, the recording data generation unit 12b acquires the ink amount image data in Step S200.

In Step S210 to Step S260, the ink amount correction unit 12a corrects the ink amount image data acquired in Step S200. Step S210 to Step S260 may be referred to as an ink amount correction step. In Step S210, the ink amount correction unit 12a selects, as a correction target, one of the pixels forming the ink amount image data. The pixel selected in Step S210 is referred to as a "target pixel".

In Step S220, the ink amount correction unit 12a determines whether the target pixel is a pixel corresponding to the second nozzle range 25. The pixel corresponding to the second nozzle range 25 is a pixel at a position recorded by the nozzles 20 belonging to the second nozzle range 25. Thus, a pixel that does not correspond to the second nozzle range 25 is a pixel at a position recorded by the nozzles 20 belonging to the first nozzle range 24. If the target pixel is the pixel corresponding to the second nozzle range 25, the ink amount correction unit 12a proceeds from "Yes" in Step S220 to Step S230. In contrast, if the target pixel is the pixel that does not correspond to the second nozzle range 25, the ink amount correction unit 12a proceeds from "No" in Step S220 to Step S250.

In Step S230, the ink amount correction unit 12a determines whether the target pixel has the secondary color generated from the first ink and the second ink. The first ink and the second ink referred to herein indicate an ink combination having a relationship with a plurality of inter-color distances in the recording head 19. With reference to the example of FIG. 3, as described above, each of the combination of the ink Y and the ink C, the combination of the ink Y and the ink M, the combination of the ink K and the ink C, and the combination of the ink K and the ink M corresponds to the combination of the first ink and the second ink. In contrast, each of the combination of the ink K and the ink Y and the combination of the ink C and the ink M does not correspond to the combination of the first ink and the second ink.

The expression "having the secondary color generated from the first ink and the second ink" indicates that each of the first ink and the second ink has a tone value greater than 0. For example, it can be understood that the target pixel with an ink amount (C, M, Y, K)=(50, 0, 50, 0) has the secondary color generated from the first ink and the second ink since neither of the tone value of the ink C nor the tone value of the ink Y is 0. Further, for example, it can also be said that the target pixel with (C, M, Y, K)=(100, 40, 120, 0) has the secondary color generated from the first ink and the second ink since neither of the tone value of the ink C nor the tone value of the ink Y is 0. Moreover, it can also be said that such a target pixel has the secondary color generated from the first ink and the second ink since neither of the tone value of the ink M nor the tone value of the ink Y is 0.

As a matter of course, it cannot be said that the target pixel has the secondary color generated from the first ink and the second ink when all the CMYK tone values are 0 or only one of C, M, Y, and K has a tone value greater than 0. Further, for example, when neither of the tone value of the ink C nor the tone value of the ink M is 0 as in the case of the target pixel with (C, M, Y, K)=(50, 20, 0, 0), the combination of the ink C and the ink M does not correspond to the combination of the first ink and the second ink according to the example of FIG. 3. Thus, it cannot be said that such a target pixel has the secondary color generated from the first ink and the second ink.

When the target pixel has the secondary color generated from the first ink and the second ink, the ink amount correction unit 12a proceeds from "Yes" in Step S230 to Step S240. Meanwhile, when the target pixel does not have the secondary color generated from the first ink and the second ink, the ink amount correction unit 12a proceeds from "No" in Step S230 to Step S250. In the target pixel, only one of C, M, Y, and K has a tone value greater than 0. Thus, a case in which the processing proceeds to Step S250 after determination of "No" in Step S230 corresponds to a case in which recording is performed with the primary color through ejection of any one of the first ink and the second ink during recording on the medium 30 using the nozzles 20 belonging to the second nozzle range 25. In this case, as described later, any one of the first ink and the second ink is ejected by an ink amount corrected with the first correction value. With this, recording is performed on the medium 30 with the primary color. A case in which the processing proceeds to Step S240 after determination of "Yes" in Step S230 corresponds to a case in which recording is performed with the secondary color through ejection of the first ink and the second ink during recording on the medium 30 using the nozzles 20 belonging to the second nozzle range 25.

In Step S240, the ink amount correction unit 12a corrects an ink amount of the target pixel with the second correction value. The second correction value is a correction value obtained by applying the off-set value to the first correction value. Correction with the second correction value is synonymous with correction with the first correction value and the off-set value. In other words, a tone value that is a tone value of each of C, M, Y, and K of the target pixel and that is other than 0 is corrected with the first correction value that is set for the nozzle 20 of each of C, M, Y, and K at a position used for recording of the target pixel and the off-set value that is set in the above-mentioned off-set value setting processing.

In a specific example, it is assumed that an ink amount of the target pixel is (C, M, Y, K)=(50, 0, 50, 0). Further, it is assumed that the first correction value for the nozzle 20 of the ink C corresponding to the position of the target pixel equals to −2, the first correction value for the nozzle 20 of the ink Y corresponding to the position of the target pixel equals to +3, the off-set value of the ink C of the off-set values relating to the secondary color generated from the ink C and the ink Y equals to −1, and the off-set value of the ink Y of the off-set values relating to the secondary color generated from the ink C and the ink Y equals to −1. In this case, the ink amount correction unit 12a adds the first correction value being −2 and the off-set value being −1 to C=50 of the target pixel. Moreover, the first correction value being +3 and the off-set value being −1 are added to Y=50 of the target pixel. As a result, the ink amount of the target pixel is corrected to (C, M, Y, K)=(47, 0, 52, 0).

Depending on an ink amount of the target pixel, a plurality of off-set values can be applied to an ink amount of one color in some cases. In a specific example, it is assumed that an ink amount of the target pixel is (C, M, Y, K)=(50, 80, 50, 0). Similarly to the description given above, it is assumed that the first correction value for the nozzle 20 of the ink C corresponding to the position of the target pixel equals to −2, the first correction value for the nozzle 20 of the ink Y corresponding to the position of the target pixel equals to +3, the off-set value of the ink C of the off-set values relating to the secondary color generated from the ink C and the ink Y equals to −1, and the off-set value of the ink Y of the off-set values relating to the secondary color generated from the ink C and the ink Y equals to −1. Moreover, it is assumed that the first correction value for the nozzle 20 of the ink M corresponding to the position of the target pixel equals to −3, the off-set value of the ink M of the off-set values relating to the secondary color generated from the ink M and the ink Y equals to +1, and the off-set value of the ink Y of the off-set values relating to the secondary color generated from the ink M and the ink Y equals to −1. In this case, the ink amount correction unit 12a corrects C=50 of the target pixel to C=47 by adding the first correction value being −2 and the off-set value being −1 thereto. Further, M=80 of the target pixel is corrected to M=78 by adding the first correction value being −3 and the off-set value being +1 thereto.

As described above, when the ink amount of the target pixel is (C, M, Y, K)=(50, 80, 50, 0), the ink Y has a plurality of off-set values applicable thereto, including the off-set value being −1 relating to the secondary color generated with the ink C and the off-set value being −1 relating to the secondary color generated with the ink M. The ink amount correction unit 12a may simply add the plurality of applicable off-set values, and may correct Y=50 of the target pixel to Y=51 by adding the first correction value being +3 and the off-set value being −2 thereto. Alternatively, in consideration of a risk of excessive correction due to simultaneous application of the plurality of off-set values, the ink amount correction unit 12a may add the plurality of applicable off-set values using a predetermined weighting coefficient and then add the resulting value to the first correction value. For example, Y=50 of the target pixel may be corrected to Y=52 by adding the first correction value being +3 and −1 that is an average value of the plurality of off-set values.

Meanwhile, in Step S250, the ink amount correction unit 12a corrects an ink amount of the target pixel with the first correction value. In other words, a tone value that is a tone value of each of C, M, Y, and K of the target pixel and that is other than 0, is corrected with the first correction value that is set for the nozzle 20 of each of C, M, Y, and K at a position used for recording of the target pixel.

After Step S240 or Step S250, in Step S260, the ink amount correction unit 12a determines whether all the pixels forming the ink amount image data have been selected as target pixels. When there still remains a pixel that is not selected as a target pixel, the processing returns from "No" in Step S260 to Step S210, and one pixel is newly selected as a target pixel. Meanwhile, when all the pixels forming the ink amount image data have been selected as target pixels, the processing proceeds from "Yes" in Step S260 to Step S270.

In Step S270, the recording data generation unit 12b subjects the ink amount image data after correction to the halftone processing, and generates the recording data containing information relating to dot-on or dot-off for each pixel and for each ink.

In Step S280, the recording control unit 12c executes processing for outputting the recording data. In other words, the recording control unit 12c controls the transport unit 17 to start transport of the medium 30, and transfers the recording data to the recording head 19. As a result, a dot of each ink is ejected from each of the nozzles 20 onto the medium 30 in accordance with the recording data, and thus the image expressed by the recording data is recorded on the medium 30. In the recording result thus obtained, color unevenness due to variation of ejection characteristics for each of the nozzles 20 is suppressed by an effect of the first correction value. In addition, color unevenness caused by the plurality of inter-color distances between the nozzle group of the first ink and the nozzle group of the second ink for recording with the secondary color is suppressed by an effect of the first correction value, as in the secondary color test pattern TP1 in FIG. 5, for example.

The off-set value may be a coefficient indicating a ratio such as 1.5 and 0.75, for example, apart from a value to be added up and used together with the first correction value, such as "+1" and "−1" as described above. In other words, there may be adopted a mode in which the first correction value is multiplied by an off-set value being a ratio to obtain the second correction value and an ink amount is corrected with the second correction value thus obtained.

5. SUMMARY

As described above, according to the present exemplary embodiment, the recording device 10 includes the recording head 19 including the first nozzle group in which the plurality of nozzles 20 configured to eject the first ink are aligned in the nozzle alignment direction D3 and the second nozzle group in which the plurality of nozzles 20 configured to eject the second ink having a color different from that of the first ink are aligned in the nozzle alignment direction D3, the moving unit configured to relatively move the recording head 19 and the medium 30 in the moving direction intersecting with the nozzle alignment direction D3, and the control unit 11 configured to control the recording head 19 and the moving unit. The recording head 19 includes the first nozzle range 24 that corresponds to parts of the first nozzle group and the second nozzle group and in which the distance between the first nozzle group and the second nozzle group in the moving direction is a first distance and the second nozzle range 25 that corresponds to parts of the first nozzle group and the second nozzle group and in which the distance between the first nozzle group and the second nozzle group in the moving direction is a second distance greater than the first distance. Further, in a case in which recording is performed on the medium 30 using the nozzles 20 belonging to the second nozzle range 25, when recording is performed on the medium 30 with the primary color through ejection of any one of the first ink and the second ink, the control unit 11 performs recording on the medium 30 with the primary color through ejection of any one of the first ink and the second ink with an ink amount thereof corrected with the first correction value, and when recording is performed on the medium 30 with the secondary color through ejection of the first ink and the second ink, the control unit 11 performs recording on the medium 30 with the secondary color through ejection of the first ink and the second ink with ink amounts thereof corrected with the second correction value obtained by the first correction value and the off-set value.

With this configuration, during recording on the medium 30 using the nozzles 20 belonging to the second nozzle range 25, when recording is performed with the secondary color using the first ink and the second ink, the control unit 11 corrects an ink amounts with the second correction value obtained by the first correction value and the off-set value. Thus, color unevenness of the secondary color, which is caused in the recording result due to the difference between the first distance and the second distance, for example, as illustrated in the image 31 of FIG. 2, can be suppressed. With this, satisfactory image quality can be provided. Further, according to the present exemplary embodiment, an ink amount is corrected with the second correction value. Thus, even when the input data is in a format of ink amount image data, color unevenness of the secondary color, which is caused by the plurality of inter-color distances, can be suppressed.

In addition to the device and the system, the present exemplary embodiment involves disclosures in various categories, such as a method executed by the device or the system, and the program 12 for causing a processor to execute the method.

For example, the recording method performed by the recording device 10, the recording device 10 including: the recording head 19 including the first nozzle group in which the plurality of nozzles 20 configured to eject the first ink are aligned in the nozzle alignment direction D3 and the second nozzle group in which the plurality of nozzles 20 configured to eject the second ink having a color different from that of the first ink are aligned in the nozzle alignment direction D3 and the moving unit configured to relatively move the recording head 19 and the medium 30 in the moving direction intersecting with the nozzle alignment direction D3, the recording method includes a recording step of performing recording by controlling the recording head 19 and the moving unit. In the recording step, in a case in which the recording is performed on the medium 30 using the nozzles 20 belonging to the second nozzle range, when the recording is performed on the medium 30 with the primary color through ejection of any one of the first ink and the second ink, the recording is performed on the medium 30 with the primary color through ejection of any one of the first ink and the second ink with an ink amount thereof corrected with the first correction value and when the recording is performed on the medium 30 with the secondary color through ejection of the first ink and the second ink, the recording is performed on the medium 30 with the secondary color through ejection of the first ink and the second ink with ink amounts thereof corrected with the second correction value obtained by the first correction value and the off-set value.

6. MODIFIED EXAMPLES

Some modified examples included in the present exemplary embodiment are described. Combinations of the modified examples are also included within the scope of the present exemplary embodiment. For the modified examples, description common to the exemplary embodiment described above is omitted as appropriate.

First Modified Example

Figure 7:
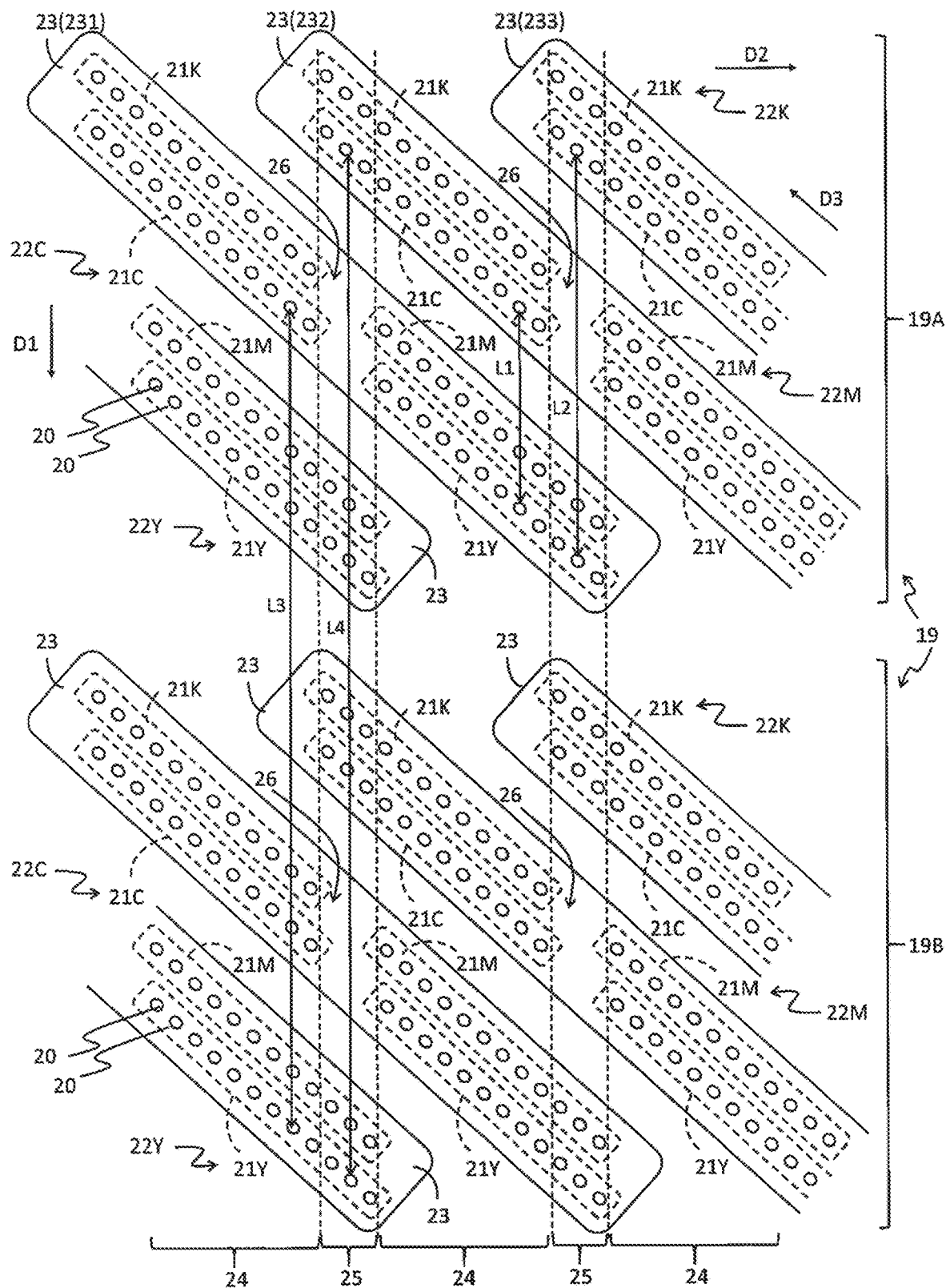
FIG. 7 is a view illustrating part of the recording head according to a modified example in an enlarged manner.

FIG. 7 illustrates part of the recording head 19 according to a first modified example in an enlarged manner. The way of viewing FIG. 7 is the same as the way of viewing FIG. 3. In the first modified example, the plurality of nozzle chips 23 aligned along the width direction D2 are collectively referred to as a "nozzle group unit". The recording head 19 includes a plurality of nozzle group units. FIG. 7 illustrates a nozzle group unit 19A as a "first nozzle group unit" and a nozzle group unit 19B as a "second nozzle group unit". The plurality of nozzle group units including the nozzle group units 19A and 19B are arranged along the transport direction D1 and have a common configuration. Further, it may be understood that each of the plurality of nozzle group units has substantially the same configuration as the recording head 19 described with reference to FIG. 3. Therefore, the sections of the first nozzle range 24 and the second nozzle range 25 in the width direction D2 are common to the plurality of nozzle group units.

However, as compared to the recording head 19 in FIG. 3, the positions of the nozzle row 21Y and the nozzle row 21C are switched in each of the nozzle chips 23 in the recording head 19 in FIG. 7. In other words, in the nozzle chip 23, the nozzle row 21C is present on the left side and downstream of the nozzle row 21K, and the nozzle row 21Y is present on the right side and downstream of the nozzle row 21M. Therefore, in the first modified example, each of the combination of the ink K and the ink M, the combination of the ink K and the ink Y, the combination of the ink C and the ink M, and the combination of the ink C and the ink Y corresponds to the combination of the first ink and the second ink with the plurality of inter-color distances.

Recording on the medium 30 with the four colors C, M, Y, and K can be completed using only one nozzle group unit, and recording on the medium 30 with the four colors C, M, Y, and K can also be completed using the plurality of nozzle group units. Therefore, for example, when it is assumed that recording is performed with the secondary color generated from the ink C and the ink Y, recording can be performed using the nozzle group 22C and the nozzle group 22Y in the nozzle group unit 19A, and recording can also be performed using the nozzle group 22C in the nozzle group unit 19A and the nozzle group 22Y in the nozzle group unit 19B.

A mode in which recording is performed with the secondary color using each of the nozzle groups in any one of the nozzle group units is referred to as a first recording mode, and a mode in which recording is performed with the secondary color using each of the nozzle groups belonging to different nozzle group units is referred to as a second recording mode. For example, in accordance with an instruction from a user, the control unit 11 is capable of executing any one of the first recording mode and the second recording mode. The first recording mode is processing as described above with reference to FIG. 6. In other words, in the first recording mode, when recording is performed on the medium 30 with the secondary color through ejection of the first ink and the second ink using the nozzles 20 belonging to the second nozzle range 25 in the first nozzle group and the second nozzle group in the nozzle group unit 19A, the control unit 11 performs recording on the medium 30 with the secondary color through ejection of the first ink and the second ink with ink amounts thereof corrected with the second correction value, as described in FIG. 6.

Meanwhile, in the second recording mode, the second correction value is not used, and the first correction value is used. Since the second correction value is not used, Step S220, Step S230, and Step S240 in FIG. 6 are not required in the second recording mode, and Step S250 is executed after Step S210. In other words, in the second recording mode, when recording is performed on the medium 30 with the secondary color through ejection of the first ink and the second ink using the nozzles 20 belonging to the second nozzle range 25 in the first nozzle group in the nozzle group unit 19A and the second nozzle group in the nozzle group unit 19B, the control unit 11 performs recording on the medium 30 with the secondary color through ejection of the first ink and the second ink with ink amounts thereof corrected with the first correction value.

The reason for not using the second correction value in the second recording mode is that the ratio of the first distance and the second distance, which are the plurality of inter-color distances between the first nozzle group and the second nozzle group, is smaller than that in the first recording mode. As illustrated in FIG. 7, a ratio of an inter-color distance L4 between the first nozzle group and the second nozzle group in the second nozzle range 25 to an inter-color distance L3 between the first nozzle group and the second nozzle group in the first nozzle range 24 in the second recording mode, that is, L4/L3, is smaller than a ratio of the inter-color distance L2 between the first nozzle group and the second nozzle group in the second nozzle range 25 to the inter-color distance L1 between the first nozzle group and the second nozzle group in the first nozzle range 24 in the first recording mode, that is, L2/L1.

The inter-color distances L1 and L2 are as described above with reference to FIG. 3. The inter-color distance L3 is an inter-color distance between the nozzle group 22C in the nozzle group unit 19A and the nozzle group 22Y in the nozzle group unit 19B in the first nozzle range 24, and the inter-color distance L4 is an inter-color distance between the nozzle group 22C in the nozzle group unit 19A and the nozzle group 22Y in the nozzle group unit 19B in the second nozzle range 25. In the second recording mode, at the time of recording with the secondary color generated from the ink C and the ink Y, the inter-color distance L3 corresponds to the first distance, and the inter-color distance L4 corresponds to the second distance. As a matter of course, there is a difference between the inter-color distances L3 and L4. However, in view of the ratio of the distances, the difference is negligible. Thus, color unevenness of the secondary color due to the difference between the inter-color distances L3 and L4 is hardly noticeable, and the necessity for using the second correction value obtained by applying the off-set value to the first correction value is low.

As described above, in the second recording mode in which recording is performed with the secondary color using each of the nozzle groups belonging to the different nozzle group units, the difference between the first distance and the second distance in terms of ratio is smaller than that in the first recording mode. Thus, the second correction value is not used for ink amount correction in the first modified example. With this, ink amounts can be prevented from being excessively applied more than required, and the ink amount correction processing can be simplified.

Second Modified Example

A second modified example is described with the first modified example in view. The second modified example focuses on the first recording mode. In a case in which recording is performed on the medium 30 with the secondary color through ejection of the first ink and the second ink using the nozzles 20 belonging to the second nozzle range 25 in the first nozzle group and the second nozzle group in the first nozzle group unit, when the combination of the first ink and the second ink corresponds to a specific combination, the control unit 11 performs recording on the medium 30 with the secondary ink through ejection of the first ink and the second ink with ink amounts thereof corrected with the first correction value.

The "specific combination" indicates, of the combinations of two colors achievable by the recording head 19, a combination relatively less frequently used for recording with the secondary color. As described above, in the example of FIG. 7, each of the combination of the ink K and the ink M, the combination of the ink K and the ink Y, the combination of the ink C and the ink M, and the combination of the ink C and the ink Y corresponds to the combination of the first ink and the second ink with the plurality of inter-color distances. Here, the specific combination is set in advance. In this case, it is assumed that the specific combination is the combination of the ink K and the ink C. This is because a case in which the same pixel has a tone value greater than 0 for both K and Y is relatively rare.

In other words, in the second modified example, even when the control unit 11 proceeds from "Yes" in Step S230 to Step S240 in FIG. 6, of the tone values of C, M, Y, and K greater than 0 in the target pixel, each of the tone values of the ink K and the ink Y forming the specific combination is corrected without using the off-set value relating to the secondary color generated from the ink K and the ink Y. In the second modified example described above, in the case of the specific combination used relatively less frequently for recording with the secondary color, the ink amount correction processing can be simplified by correcting the ink amounts with the first correction value.

OTHER MODIFIED EXAMPLES

As described above, there may be adopted a configuration in which the recording head 19 is mounted on the carriage 18 and moves together with the carriage 18. Movement of the recording head 19 by the carriage 18 is also simply referred to as movement of the recording head 19. For example, in FIG. 2, FIG. 3, and FIG. 7, the recording head 19 may be reciprocable in parallel to the transport direction D1. In other words, the carriage 18 may perform at least part of relative movement of the recording head 19 and the medium 30 in the moving direction. Therefore, in addition to the transport unit 17, the carriage 18 may also correspond to the moving unit in some cases.

Alternatively, in FIG. 2, FIG. 3, and FIG. 7, the direction D2 may be the transport direction in which the transport unit 17 transports the medium 30 instead of the direction D1, and there may be adopted a configuration in which the recording head 19 reciprocates in parallel to the direction D1. In other words, transport of the medium 30 along the direction D2, that is, so-called paper feeding, and reciprocation of the serial-type recording head 19 along the direction D1 may be combined with each other to record a two-dimensional image on the medium 30. In this case, the direction D1 corresponds to the moving direction and the width direction of the medium 30, and the carriage 18 corresponds to the moving unit that relatively moves the recording head 19 and the medium 30. Moreover, in a configuration in which the direction D2 is the transport direction of the medium 30 by the transport unit 17, the recording head 19 may perform reciprocation in parallel to the direction D2 in addition to reciprocation in parallel to the direction D1.

What is claimed is:

1. A recording device, comprising:
a recording head including a first nozzle group in which a plurality of nozzles configured to eject first ink are aligned in a nozzle alignment direction and a second nozzle group in which a plurality of nozzles configured to eject second ink having a color different from that of the first ink are aligned in the nozzle alignment direction;
a moving unit configured to relatively move the recording head and a medium in a moving direction intersecting with the nozzle alignment direction; and
a control unit configured to control the recording head and the moving unit, wherein
the recording head includes:
a first nozzle range that corresponds to parts of the first nozzle group and the second nozzle group and in which a distance between the first nozzle group and the second nozzle group in the moving direction is a first distance and
a second nozzle range that corresponds to parts of the first nozzle group and the second nozzle group and in which a distance between the first nozzle group and the second nozzle group in the moving direction is a second distance greater than the first distance and
in a case in which recording is performed on the medium using nozzles belonging to the second nozzle range, when recording is performed on the medium with a primary color through ejection of any one of the first ink and the second ink, the control unit performs recording on the medium with the primary color through ejection of any one of the first ink and the second ink with an ink amount thereof corrected with a first correction value and
when recording is performed on the medium with a secondary color through ejection of the first ink and the second ink, the control unit performs recording on the medium with the secondary color through ejection of the first ink and the second ink with ink amounts thereof corrected with a second correction value obtained by the first correction value and an off-set value.

2. The recording device according to claim 1, wherein
the recording head includes a plurality of nozzle group units including the first nozzle group and the second nozzle group,
the plurality of nozzle group units are arranged along the moving direction,
when recording is performed on the medium with the secondary color through ejection of the first ink and the second ink using nozzles belonging to the second nozzle range in the first nozzle group and the second nozzle group in a first nozzle group unit of the plurality of nozzle group units, the control unit performs recording on the medium with the secondary color through ejection of the first ink and the second ink with ink amounts thereof corrected with the second correction value, and
when recording is performed on the medium with the secondary color through ejection of the first ink and the second ink using nozzles belonging to the second nozzle range in the first nozzle group in the first nozzle group unit and the second nozzle group in a second nozzle group unit of the plurality of the nozzle group units, the control unit performs recording on the medium with the secondary color through ejection of the first ink and the second ink with ink amounts thereof corrected with the first correction value.

3. The recording device according to claim 2, wherein
in a case in which recording is performed on the medium with the secondary color through ejection of the first ink and the second ink using the nozzles belonging to the second nozzle range in the first nozzle group and the second nozzle group in the first nozzle group unit, when a combination of the first ink and the second ink corresponds to, of combinations of two colors achievable by the recording head, a specific combination relatively less frequently used for recording with the secondary color, the control unit performs recording on the medium with the secondary color through ejection of the first ink and the second ink with ink amounts thereof corrected with the first correction value.

4. A recording method performed by a recording device, the recording device including:
a recording head including a first nozzle group in which a plurality of nozzles configured to eject first ink are aligned in a nozzle alignment direction and a second nozzle group in which a plurality of nozzles configured to eject second ink having a color different from that of the first ink are aligned in the nozzle alignment direction and
a moving unit configured to relatively move the recording head and a medium in a moving direction intersecting with the nozzle alignment direction,
the recording head including:
a first nozzle range that corresponds to parts of the first nozzle group and the second nozzle group and in which a distance between the first nozzle group and the second nozzle group in the moving direction is a first distance and
a second nozzle range that corresponds to parts of the first nozzle group and the second nozzle group and in which a distance between the first nozzle group and the second nozzle group in the moving direction is a second distance greater than the first distance,
the recording method comprising:
a recording step of performing recording by controlling the recording head and the moving unit, wherein
in the recording step, in a case in which the recording is performed on the medium using nozzles belonging to the second nozzle range, when the recording is performed on the medium with a primary color through ejection of any one of the first ink and the second ink, the recording is performed on the medium with the primary color through ejection of any one of the first ink and the second ink with an ink amount thereof corrected with a first correction value and
when the recording is performed on the medium with a secondary color through ejection of the first ink and the second ink, the recording is performed on the medium with the secondary color through ejection of the first ink and the second ink with ink amounts thereof corrected with a second correction value obtained by the first correction value and an off-set value.

* * * * *